United States Patent [19]
Horiuchi

[11] Patent Number: 6,085,857
[45] Date of Patent: Jul. 11, 2000

[54] FRAME STRUCTURE OF SADDLE RIDING TYPE VEHICLE

[75] Inventor: Tadanori Horiuchi, Saitama, Japan

[73] Assignee: Honda Giken Kogyo Kabushiki Kaisha, Tokyo, Japan

[21] Appl. No.: 09/112,142

[22] Filed: Jul. 9, 1998

[30]     Foreign Application Priority Data

Aug. 27, 1997  [JP]  Japan ..................................... 9-231410

[51] Int. Cl.⁷ ............................. B60K 5/00; B60K 17/00; B62D 21/02
[52] U.S. Cl. ......................... 180/292; 180/311; 280/781
[58] Field of Search .................................... 180/312, 311, 180/292, 377, 378, 210, 215, 217; 280/781, 785

[56]             References Cited

U.S. PATENT DOCUMENTS 4,535,869  8/1985  Tsutsumikoshi et al. .............. 180/311
4,852,678  8/1989  Yamaguchi .............................. 280/781

FOREIGN PATENT DOCUMENTS 532791     3/1993  European Pat. Off. ............... 180/311
63-1234B2  1/1988  Japan .
1-172087   7/1989  Japan .................................... 180/311

*Primary Examiner*—Peter C. English
*Attorney, Agent, or Firm*—Birch, Stewart, Kolasch & Birch, LLP

[57]             ABSTRACT

An engine assembly which is longer in the front and rear directions is formed by integrally connecting a horizontally opposed engine having a pair of cylinders projecting generally horizontally from left and right sides of the crank case, an automatic transmission, and a rear wheel gear box. The front part of a body frame is coupled to the front part of the engine assembly with bolts and a fitting projection which is formed on a lower part of the rear part of the body frame is coupled to the rear part of the engine assembly with a bolt. Thereby, the engine assembly forms a part of the main body frame.

29 Claims, 5 Drawing Sheets

FRAME STRUCTURE OF SADDLE RIDING TYPE VEHICLE

BACKGROUND OF THE INVENTION

1. Field of the Invention

The present invention relates to a frame structure for a saddle riding type vehicle, i.e., a 4-wheel buggy which is suitable for running on ungraded land.

2. Description of Related Art

Japanese Published Patent Application No. Sho 63-1234 describes a frame structure for a 4-wheel buggy in which a body frame is constructed of a pair of right and left pipe frames that form a loop in side view. An engine which is loaded or unloaded from a side of the body is supported within the loop formed by the pipe frames. The front wheel is suspended and a steering shaft is supported by the front area of the frame structure, while a saddle riding type seat is supported on the upper part of the engine. The rear wheels are suspended by the rear part of the frame structure.

In the above-described frame structure, since the engine must be loaded or unloaded from a side of the body, many steps are required to load and unload the engine therefrom. Therefore, maintenance on the engine is increased. Moreover, the engine is not used as a strength member, which would increase the rigidity of frame, because the engine must be supported through vibration mounts to the body frame even though the engine is formed of a rigid member. Therefore, the total weight of the body frame increases. Furthermore, since the body frame is entirely assembled by welding, the number of welding points increases resulting in an increase of assembling steps and manufacturing cost.

SUMMARY OF THE INVENTION

In view of overcoming the problems explained above, a first embodiment of the present invention includes a frame structure for a saddle riding type vehicle having an engine at a center area of the body, a front wheel at a front part of the body, and a pair of rear wheels on the right and left sides of a rear part of the body. The engine assembling body is longer in the front and rear directions to integrate a transmission. Furthermore, a member for transferring the power to the rear wheels in the rear part of the engine is provided. A front wheel suspending mechanism and a front portion of the body frame which supports a steering shaft are coupled in the front portion of the body. A rear portion of the body frame which supports a seat is coupled in the rear portion to form the body frame with the engine assembling body, the front part of the body frame and the rear part of the body frame. This body frame includes a releasable lower portion and rear portion of at least the engine assembling body in the side view.

The second embodiment of the present invention includes a body frame having a releasable upper part of the front area of the engine assembling body. The engine assembling body is removably attached to the front area of the body frame and rear area of the body frame, respectively.

The third embodiment of the present invention includes a horizontally opposed engine having a pair of cylinders which generally horizontally project from the right and left sides of a crank case.

The fourth embodiment of the present invention includes the front part of the body frame having a front main frame which is coupled with the front portion of the engine assembling body and extends in the vertical direction. A pair of right and left pipe members project, almost like a loop in front of the front main frame. Furthermore, the front main frame is provided with an arm member and each supporting member of the front cushion unit forms the front wheel suspending mechanism.

The fifth embodiment of the present invention includes, in any of the embodiments described above, a step bracket mounted to the bottom part of the engine portion.

According to the first embodiment, since the engine assembling body is used as the main structural part of the body frame, the total weight of the body frame can be reduced even when the necessary frame rigidity is achieved.

Moreover, since the engine assembling body is removably loaded on the lower part of the body frame by releasing the lower and rear sides of the engine assembling body, the loading/unloading work can be done easily and maintenance can be improved.

According to the second embodiment, since the front portions and rear portions of the body frame are coupled respectively, by tightening, with the engine assembling body, the assembling work of the body frame can be done easily and the assembly can be improved since the number of welding steps is decreased. Therefore, quality is improved since the thermal influence of the welding is reduced. Moreover, since the upper front portion of the engine assembling body is released, the pipe member forming the body frame can be reduced as much as possible and thereby total weight can be reduced.

According to the third embodiment, the engine mount of the related art can be eliminated, unlike an ordinary engine type such as a front tilting type engine. The horizontally opposed engine is introduced and the engine assembling body is tightened directly to the frame member with bolts, etc. As a result, since the engine assembling body is used as the strength member, it can also be used in common as the structural part of the body frame.

According to the fourth embodiment, the front main frame is provided at the front area of the body frame. Therefore, if the upper part of engine is not provided through the main frame extending in the front and rear directions, unlike the related art, the front wheel suspending mechanism, steering shaft and front part of engine required in the front area of the body can be supported with sufficient supporting rigidity.

According to the fifth embodiment, the step bracket is mounted to the bottom part of the engine assembling body to enable integral loading/unloading with the engine assembling body. Therefore, it is no longer required to provide the conventional lower frame which supports the step on the lower part of the engine. As a result, the engine assembling body can be loaded and unloaded easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
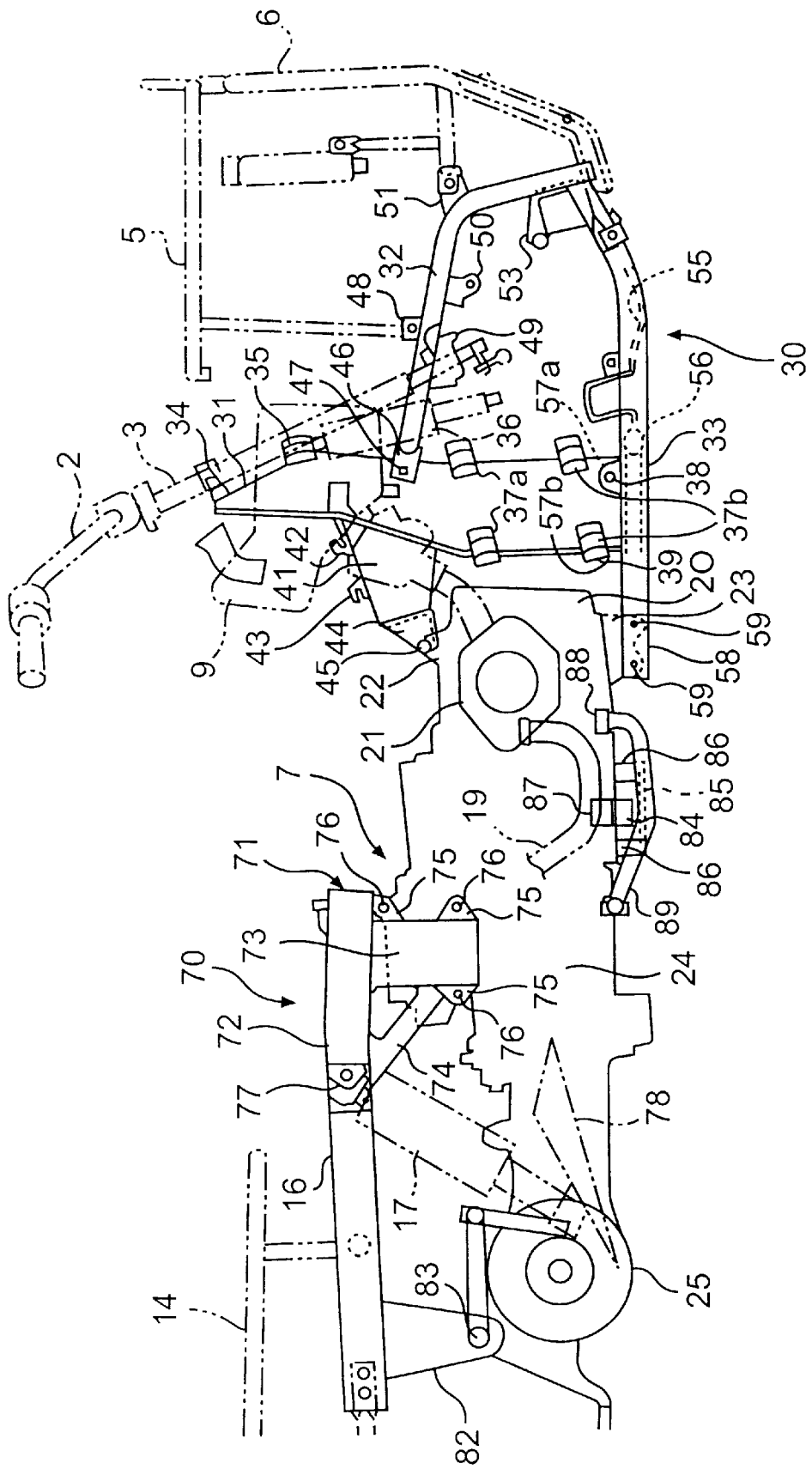
FIG. 1 is a side view of the body frame of the first embodiment of the present invention.

FIG. 1 to FIG. 4 show a preferred embodiment of the present invention applied to a 4-wheel buggy for running on ungraded land. First, in FIG. 2, the 4-wheel buggy is illustrated independently suspending a pair of right and left front wheels 1 at a front portion of the body. Free steering occurs via the steering shaft 3 which is coupled with the front wheels when the handle 2 is rotated.

The front portion of the body is provided with a front cover 4 which also serves as a front fender to cover an upper portion and a rear portion of the front wheel 1. An upper portion of the cover 4 is provided with a front carrier 5. Furthermore, a front bumper 6 is provided at a forwardmost portion of the body.

A longer engine assembling body 7 which serves as a part of the body frame is provided in the front and rear directions at the center of the body. The upper part of the engine assembling body 7 is covered with a tank cover 8. An air intake box 9 and a fuel tank 10 are provided at the front and rear inside the tank cover 8. At the rear of the tank cover 8, a saddle riding type seat 11 is provided.

A pair of right and left rear wheels 12 are suspended independently at the rear portion of the body. A rear body cover 13, which also serves as the rear fender, covers an upper portion and a front side of each rear wheel 12. A rear carrier 14 is provided at an upper portion of the rear body cover 13. Furthermore, at the rear end portion of the body, a rear bumper 15 is provided projecting upwardly from the rear end portion of the rear frame 16, thereby forming a part of the body frame.

Figure 2:
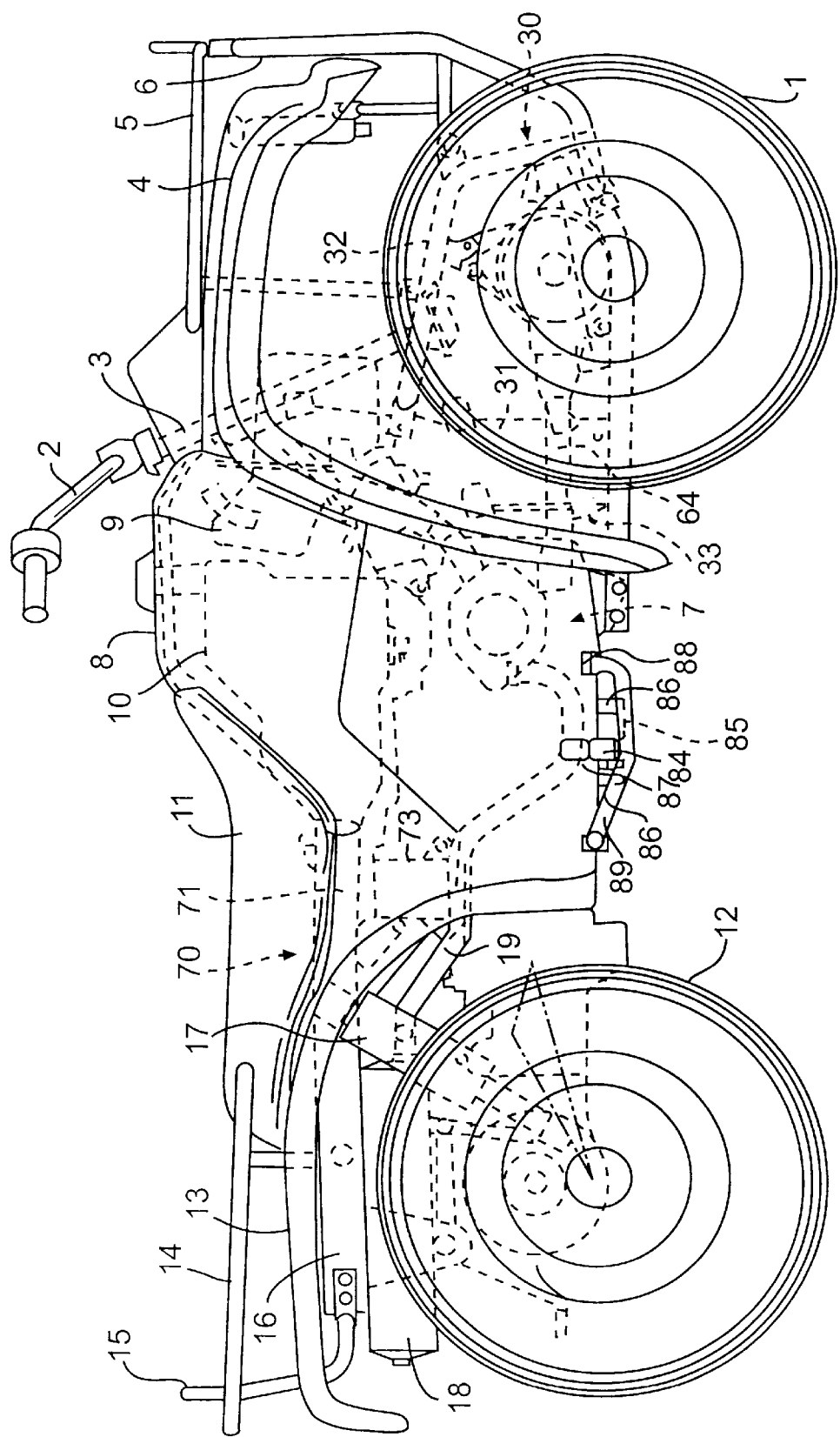
FIG. 2 is an external side view of a 4-wheel buggy according to the first embodiment of the present invention.

Referring to FIG. 2, numeral 17 designates a rear cushion unit which forms the rear wheel suspending mechanism, numeral 18 designates a muffler supported by the lower portion of the rear frame 16, and numeral 19 designates an exhaust pipe.

Figure 3:
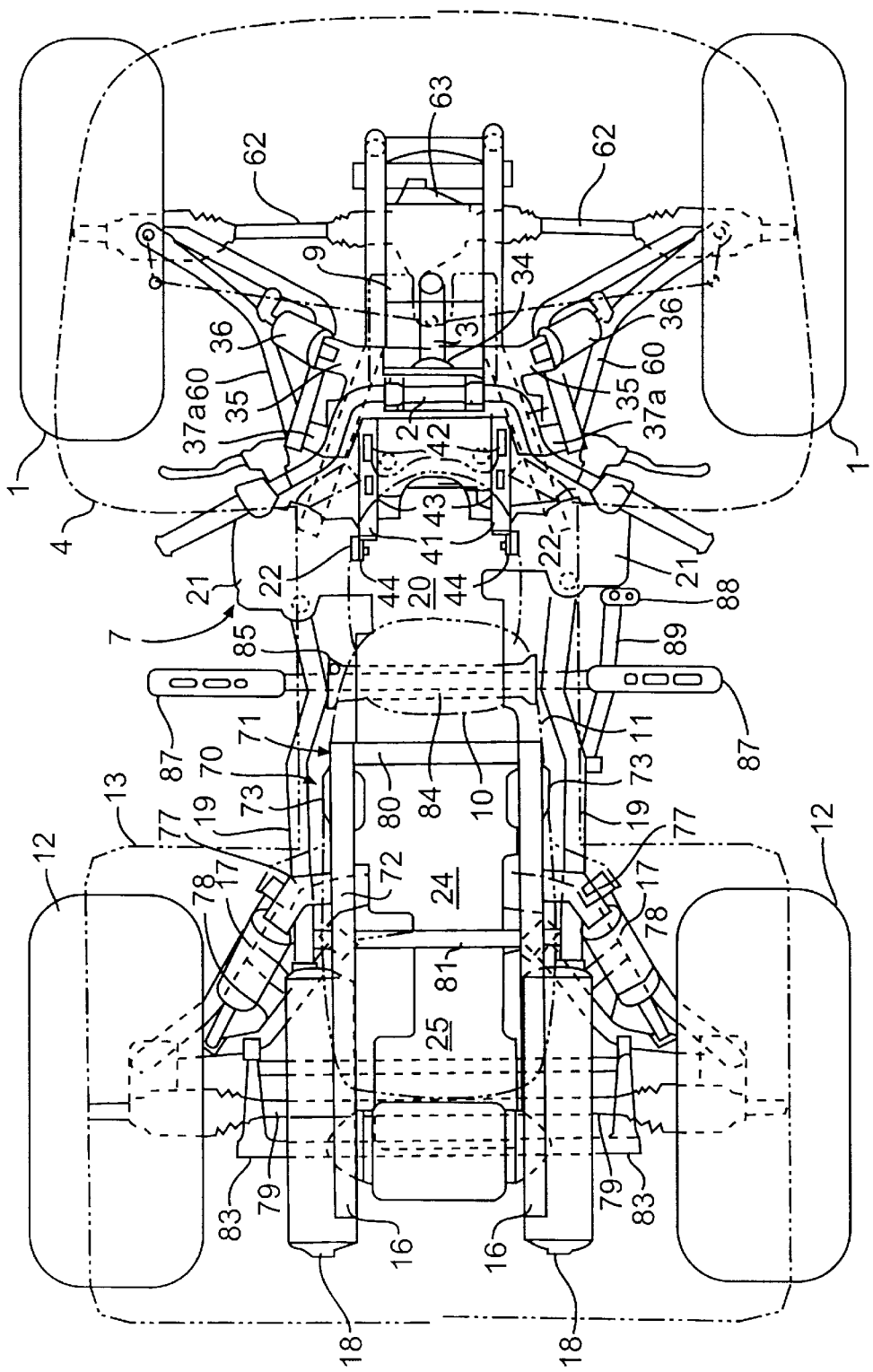
FIG. 3 is a plan view of the body frame of the first embodiment of the present invention.

In the engine, which forms the engine assembling body 7, as shown in FIG. 1 and FIG. 3, a pair of right and left cylinders 21 generally horizontally project from the right and left sides of the crank case 20. A pair of stays 22 project upwardly from the right and left upper surfaces of the crank case 20 and a pair of right and left fitting projections 23 project downwardly at the lower part of the crank case 20.

The engine assembling body 7 includes an integrated automatic transmission 24 at the rear part of the crank case 20 and a rear wheel gear box 25 at a rear part of the transmission which act as the part which is longer in the front and rear directions at the center of the body. Thereby, the engine output is converted by the automatic transmission 24 and is then transferred to a deflection unit within the rear wheel gear box 25 via the drive shaft provided in the crank case to drive the right and left rear wheels 12.

The front part of the engine assembling body 7 is connected to a front part 30 of the body frame, while the rear part thereof is connected to the rear part 70 of the body frame. Thereby, the body frame is formed from the front part 30 of the body frame, the engine assembling body 7, and the rear part of the body frame 70.

Figure 4:
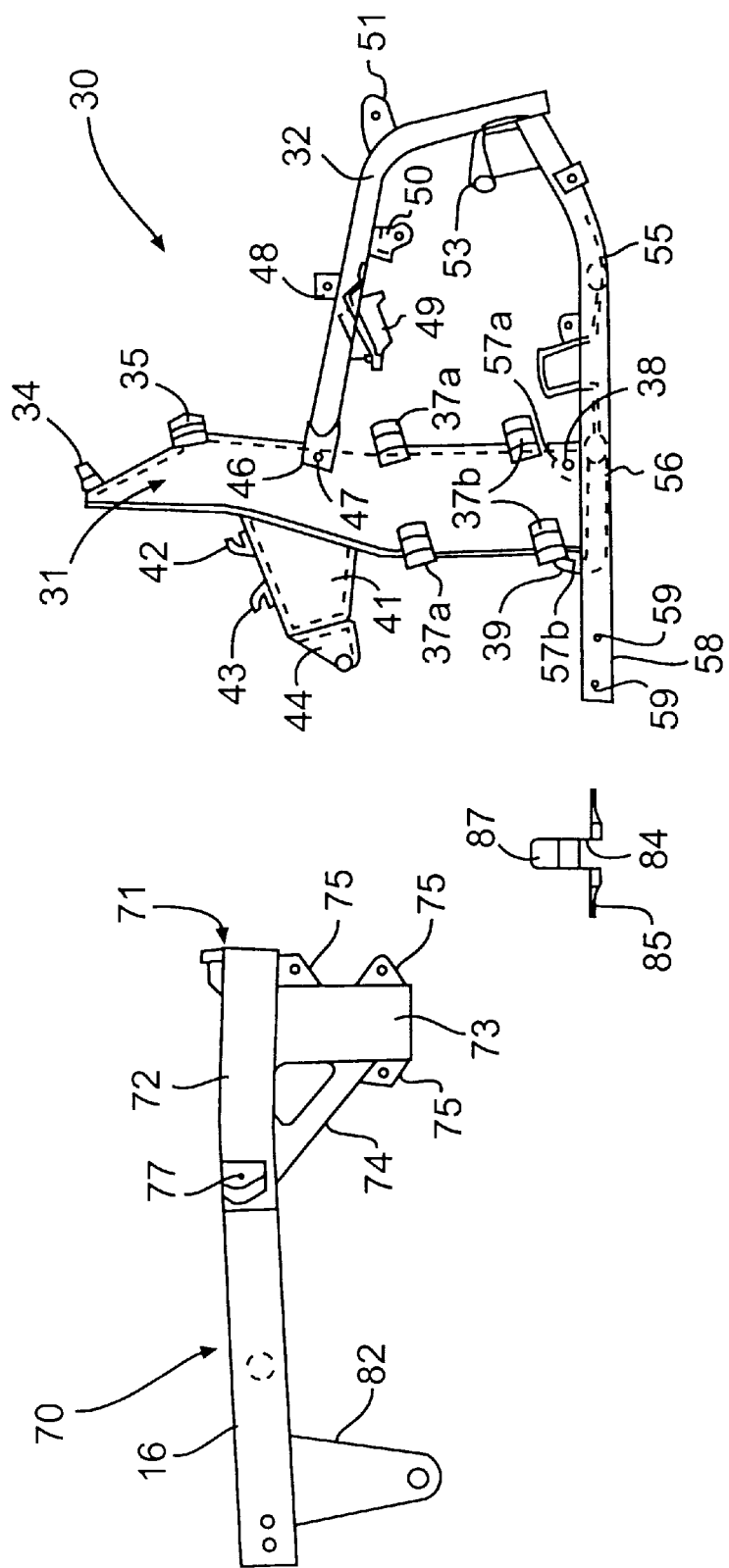
FIG. 4 is a disassembled diagram of the body frame of the first embodiment of the present invention.

As shown in FIGS. 1, 3 and 4, the front part 30 of the body frame is formed of a front main frame 31 extending in the upper and lower directions, an upper pipe 32 extending forward of the front main frame 31 and bending downward at an end portion thereof, and a lower pipe 33 extending rearward from the end portion of the upper pipe 32 and coupled with a lower end portion of the front main frame 31.

The upper pipe 32 and lower pipe 33 are formed of steel and are arranged in a pair, one on the left and one on the right of the body frame. The front main frame 31 couples the left and right pipes of the pipes 32 and 33 and is formed of cast iron. The front main frame 31 has a width which is substantially the same as the distance between the right and left pipes of the upper pipe 32 and lower pipe 33.

At the upper part of the front main frame 31, a supporting part 34 of the steering shaft 3 is provided. A pair of right and left supporting projected portions 35 project in the side direction and support the upper end part of the front cushion unit 36 therein.

At a portion of the front main frame 31 which is lower than the location where the upper pipe 32 is connected, supporting projected portions 37a, 37b are provided for supporting the front wheel suspending mechanism. The supporting projected portions 37a, 37b are respectively provided in a pair on the right and left sides of the body, spaced a distance apart.

A pair of right and left hanger arms 41 extend backwards on the right and left sides of a center portion in the vertical direction of the rear surface of the front main frame 31. A forward hook 42 and backward hook 43 are provided on the upper surfaces of each of the right and left hanger arms. Furthermore, a hanger bracket 44 is fixed by bolt at each rear end part of the right and left hanger arms 41, respectively. The crank case 20 is supported by mounting, with a bolt 45, the hanger bracket 44 to the stay 22 provided on the upper surface of the crank case 20.

The rear end part 46 of the upper pipe 32 is mounted, with a bolt 47, to the side surface of the front main frame 31. A stay 48 for supporting the rear part of the front carrier 5 is provided on the upper surface of an intermediate portion of the upper pipe 32, and a bearing part 49 for supporting the lower end part of the steering shaft 3 and the stay 50 for the front gear box are provided on a lower surface side of the upper pipe 32 near the stay 48. Furthermore, a stay 51 for supporting a front part of the front carrier 5 is provided at a location adjacent a lower bending part in front of the stays 48 and 50.

A front end portion of the lower pipe 33 is welded to the lower end portion of the upper pipe 32. A stay 53 for supporting the front gear box is mounted to a corner part of the front end portion of the lower pipe 33. At an intermediate portion of the lower pipe 33, an under guard plate 55 is welded between the right and left lower pipes 33.

A rear end portion of the under guard plate 55 is coupled to a frame member 56 which is mounted to the lower portion of the front main frame 31. Between the right and left lower pipes 33, stays 57a and 57b are formed projecting upwardly from the lower pipes 33. Furthermore, the lower portion of the front main frame 31 is tightened to each stay with the bolts 38, 39.

The rear end portions 58 of the right and left lower pipes 33 are stacked on the right and left mounting projections 23 formed on a bottom part of the crank case 20. The lower pipes 33 are mounted by tightening the bolts 59.

As is apparent from FIG. 3, the front wheel suspending mechanism is a double-wishbone type mechanism having an upper arm 60 which is axially supported by a supporting projection 37a to diagonally extend forward. A lower arm (overlapped with the upper arm 60 in the figure) is axially supported by the supporting projection 37b and a front cushion unit 36 has a lower end part mounted to the upper arm 60. Furthermore, the end portions of the upper arm 60 and lower arm are coupled with the front wheel 1.

The right and left front wheel shafts 62 are driven by front drive shaft 64 (FIG. 2) extending forwardly from the crank case 20 via the front gear box 63 which is supported by the front part 30 of the body frame. The front gear box 63 includes a deflection unit and is supported by the front gear box supporting stays 50 and 53.

The rear portion 70 of the body frame is connected to the center frame 71 and includes right and left rear frame portions 16. The center frame 71 has the general shape of a T in side view. The right and left portions 16 of the rear frame (or, collectively "rear frame 16") extend backwards generally horizontally from a rear end portion of the center frame 71. The rear portion 70 of the body frame includes right and left parts which are coupled with cross pipes 80, 81.

The rear portion 70 of the body frame is mounted on the upper part of the engine assembling body 7 and extends backwards generally horizontally to form the general shape of a box and a body frame structure in which the rear part is released from the lower part of the engine assembling body 7 at least in the side view of FIG. 1.

The center frame 71 is formed of cast iron and includes an upper part 72 extending in the front and rear directions, a lower part 73 extending in the lower direction and a reinforcing part 74 for diagonally coupling the upper and lower parts 72 and 73. Fitting projections 75 are integrally formed on the upper front side and the front and rear of the lower end part of the lower part 73. The fitting projections 75 are coupled to the upper half portion of the side surface of the case of the automatic transmission 24 using bolts 76.

A supporting projection 77 for supporting the upper end of the rear cushion unit 17 projects in the side direction from the external side surface of the rear end part of the upper part 72. The lower end part of the rear cushion unit 17 is coupled with the rear arm 78 for supporting the rear wheel suspending mechanism axially to the side surface of the case of the automatic transmission 24.

At each rear end part of the right and left rear frames 16, a stabilizer stay 82 is provided projecting in the lower direction. A stabilizer 83 is supported such that it extends between the lower end portions of the stabilizer stays 82. Furthermore, both end portions of the stabilizer 83 are coupled to the rear wheel gear box 25. As a result, the rear wheel gear box 25 is coupled with the rear frame 16 via the stabilizer 83 and stabilizer stay 82.

The numeral 79 in the figure designates a rear wheel axle, numeral 84 designates a step bracket having a cross section generally in the shape of a backwards C. The step bracket 84 is directed downwardly and is provided diagonally at the lower part of the crank case 20. On the opening side thereof, a flange 85 partially covering the bottom surface of the crank case 20 is mounted to the bottom surface of the crank case 20 with a stay 86 (FIG. 2). Furthermore, a step 87 is mounted to the right and left end portions of the step bracket 84. Moreover, numeral 88 designates a rear brake pedal of which a rear end part is attached to the front end part of the pedal arm 89 supported to rotate freely to the side surface of the lower part of the crank case 20.

Operation of the first embodiment will now be explained with reference to the figures. As shown in FIG. 1 and FIG. 4, the body frame is composed of a front part 30 of the body frame, an engine assembling body 7 and a rear part 70 of the body frame. The front part 30 of the body frame can be mounted to the engine assembling body 7 only by mounting the hanger bracket 44 to the stay 22 at the upper surface of the crank case 20 with a bolt 45 and mounting the rear end part 58 of the lower pipe 33 to the mounting projection 23 at the lower surface with a bolt 59.

Moreover, each fitting projection 75 of the lower part 73 forming the rear part 70 of the body frame is mounted to the upper part of the side surface of the case of the automatic transmission 24 using a bolt 76. Furthermore, the rear part 70 of the body frame can be mounted to the engine assembling body 7 by mounting both end portions of the stabilizer 83 to the rear wheel gear box 25.

In this case, since the engine assembling body 7 is capable of canceling an inertia force to reduce vibration since it employs the horizontally opposed engine having right and left cylinders 21 which are provided generally horizontally, the mounting portions for the front part 30 of the body frame and rear part 70 of the body frame can be mounted only with a bolt without using the engine mounting method. As a result, the engine assembling body 7 becomes a reinforcing member forming a part of the body frame.

Therefore, since the engine assembling body 7 can be used as a part of the body frame and the front part 30 of the body frame and rear part 70 thereof can be reduced as much as possible, the engine mounting structure can be simplified and total weight and cost can also be reduced.

Moreover, since the entire part of the front part 30 of the body frame can be assembled by coupling with bolts and the welding of the related art is no longer required, the total welding points can be reduced as much as possible and the number of assembling steps can also be reduced. Furthermore, the thermal influence of the welding can be reduced to improve the quality.

In addition, since the front main frame 31 is connected to the front part 30 of the body frame, even if the upper part of the engine is not provided through the main frame extending in the front and rear directions unlike the related art, supporting of the front wheel suspending mechanism (36, 60, etc.), steering shaft 3 and front part of the crank case 20 which is required in the front part of the body can be realized and sufficient supporting rigidity can be assured.

Moreover, when loading or uploading the engine assembling body 7, the engine assembling body 7 as a whole can be unloaded to the lower part of the body by removing the coupling bolts of the front part 30 and rear part 70 of the body frame. Therefore, the engine assembling body 7 can be loaded or unloaded more easily in comparison with the loading/unloading from the side direction of the body of the related art to improve ease of maintenance.

In this case, since the step bracket 84 is mounted to the bottom part of the crank case 20, the step bracket 84 can be loaded and unloaded integrally with the engine assembling body 7 and the brake pedal 88 and pedal arm 89 can also be loaded and unloaded simultaneously.

Next, the second embodiment will be explained with reference to FIG. 5. This embodiment is substantially similar to the 4-wheel buggy of the first embodiment explained above, except for the addition of structural elements to a part of the body frame. Therefore, common elements are designated by the same reference numerals and the engine assembling body and other body structure in this embodiment are not illustrated.

Figure 5:
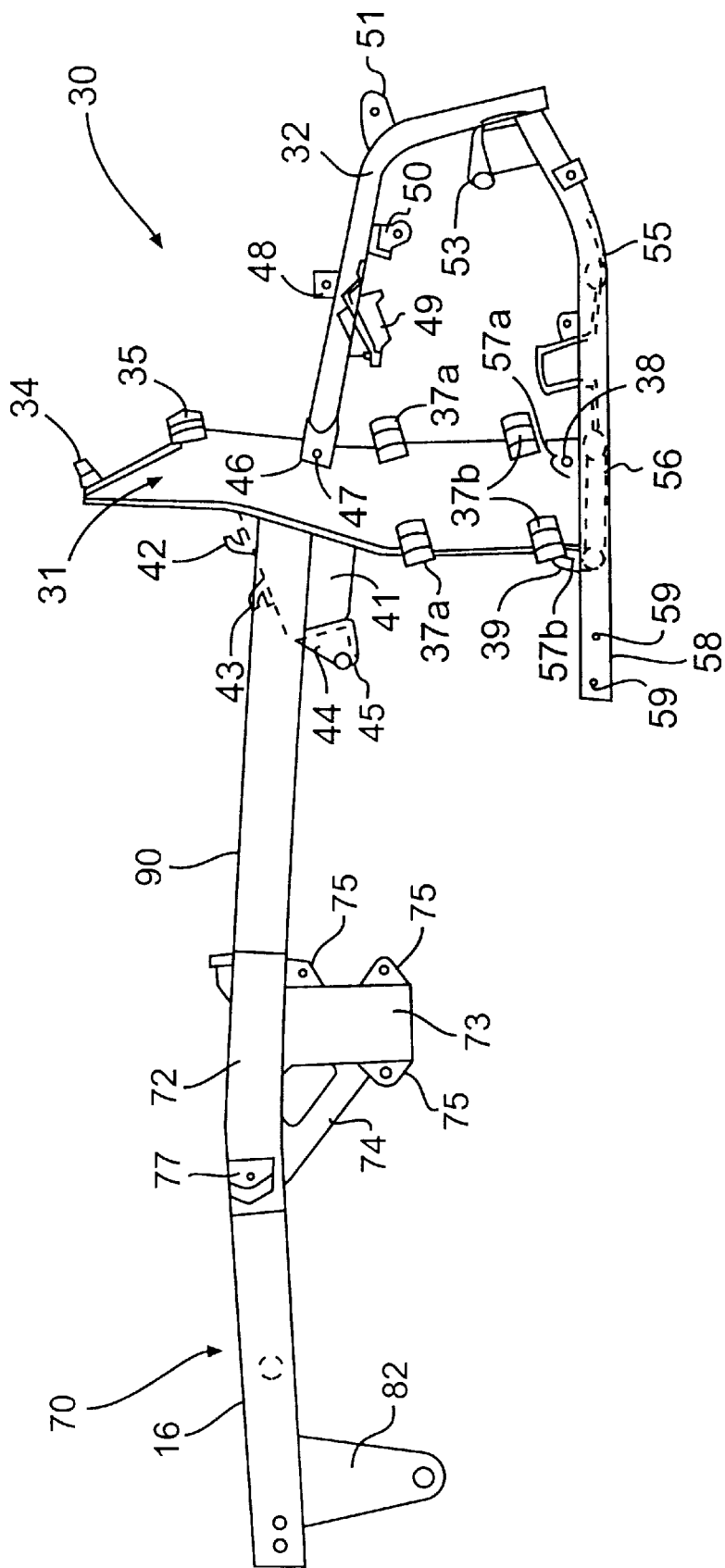
FIG. 5 is a side view of the body frame according to the second embodiment of the present invention with the engine assembling body removed.

FIG. 5 is similar to FIG. 1. As is obvious from FIG. 5, in the second embodiment, the front end part of the upper part 72 which forms the rear part 70 of the body frame for the body frame of the first embodiment and the intermediate part of rear surface of the front main frame 31 forming the front part 30 of the body frame are coupled with a center frame 90.

The center frame 90 is formed of an angled pipe having a vertically long rectangular cross section and formed of a light weight alloy. There are a pair of center pipes 90, one on the right and one on the left. Both end portions of each of the center pipes 90 are coupled with the front part 30 of body frame and rear part 70 of body frame by the welding, respectively.

The front end part of the center frame 90 is overlapped, in side view, on the external side of the hanger arm 41 and thereby the center frame 90 and rear part 70 of the body frame is continuous. Thereby, the frames are similar to the main frame which is often used in an ordinary 4-wheel buggy.

However, even in this embodiment, light weight of the body frame can of course be realized and excellent loading and unloading of the engine assembling body 7 can be accomplished by utilizing the engine assembling body 7 as a part of the body frame. Furthermore, rigidity of the body frame as a whole can be enhanced by coupling the front part 30 of the body frame and the rear part 70 of the body frame with the center frame 90.

The present invention is not limited only to the embodiments explained above and allows various changes or modifications. For example, the present invention can also be applied to a 3-wheel buggy. Moreover, the engine assembling body 7 may be another well known type such as the constant mesh type transmission or a combination of the V belt type transmission and drive shaft in place of the automatic transmission 24.

Moreover, the front bumper 6 is not always required to be a horizontally opposed type and may be a single cylinder type having either a front or rear inclination, a V type, or an inline type. In addition, the horizontal cylinder type having a single cylinder horizontally installed in the front and rear directions may also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A frame structure for a vehicle having an engine at a center area of a body, a front wheel at a front part of the body and a pair of rear wheels on right and left sides of a rear part of the body, comprising:

an engine assembly extending in front and rear directions and including a transmission and a member for transferring power to the rear wheels;

a front frame member coupled to a front portion of said engine assembly for supporting a front wheel suspending mechanism and a steering shaft; and a rear frame member coupled to a rear portion of said engine assembly for supporting a seat, said rear frame member being operatively coupled to said rear wheels, wherein said engine assembly, said front frame member, and said rear frame member form a body frame, at least a part of a lower portion of said engine assembly being free from attachment with said front and rear frame members, and said engine assembly includes a horizontally opposed engine having a pair of cylinders projecting generally to right and left sides of a crank case thereof.

2. The frame structure for a vehicle according to claim 1, wherein an upper intermediate portion of said engine assembly is free from attachment with said front and rear frame members, said engine assembly being removably attached to said front and rear frame members.

3. The frame structure for a vehicle according to claim 1, wherein said front frame member comprises:

a front main frame coupled to a front part of the engine assembly, said front main frame extending generally vertically; and a pair of right and left pipe members projecting from the front main frame, wherein the front main frame is connected to a supporting member of a front cushion unit, said front cushion unit for supporting the front wheel suspending mechanism.

4. The frame structure for a vehicle according to claim 1, wherein a step bracket is mounted to a lower portion of the engine assembly.

5. The frame structure for a vehicle according to claim 1, further comprising a center frame connected between said front frame member and said rear frame member.

6. The frame structure for a vehicle according to claim 1, wherein said rear frame member comprises:

a pair of center frames, each of said center frames being connected to said engine assembly at first ends thereof; and a pair of rear frames connected to second ends of said pair of center frames at first ends thereof, respectively.

7. The frame structure for a vehicle according to claim 6, wherein each of said pair of center frames comprises:

an upper portion extending in front and rear directions;

a lower portion extending generally vertically from said upper portion, said lower portion including a plurality of fitting projections for removably connecting to said engine assembly; and a reinforcing portion extending diagonally between said upper and lower portions.

8. The frame structure for a vehicle according to claim 1, wherein said front frame member is coupled to the engine assembly at at least two points on the front portion of said engine assembly, one of said points being located above the cylinders, and the other of said points being located below said cylinders.

9. The frame structure for a vehicle according to claim 8, wherein one of said points is located on an upper surface of said engine assembly above said cylinders, and the other of said points is located on a lower surface of said engine assembly below said cylinders.

10. The frame structure for a vehicle according to claim 8, wherein the front frame member includes:

a front main frame arranged generally vertically, said front main frame being connected to the point located above the cylinders;

first and second upper pipes connected to said front main frame; and first and second lower pipes connected to said first and second upper pipes, respectively.

11. The frame structure for a vehicle according to claim 1, wherein the front wheel and rear wheels exert forces on the body frame resulting in a moment on the body frame, the engine assembly supporting at least substantially all of said moment.

12. The frame structure for a vehicle according to claim 1, wherein the rear frame member is coupled to said engine assembly proximate to the transmission, and said transmission extending beneath the rear frame member along a substantial part of an axial length of the rear frame member.

13. The frame structure for a vehicle according to claim 1, wherein the engine assembly extends substantially along a longitudinal direction and is longest in its longitudinal direction, and the rear frame member extends substantially along a longitudinal direction and is longest in its longitudinal direction, the respective longitudinal directions being substantially parallel.

14. A frame structure for a vehicle having an engine at a center area of a body, a front wheel at a front part of the body and a pair of rear wheels on right and left sides of a rear part of the body, comprising:
an engine assembly extending in front and rear directions and including a transmission and a member for transferring power to the rear wheels;
a front frame member coupled to a front portion of said engine assembly for supporting a front wheel suspending mechanism and a steering shaft, said front frame member including,
a front main frame arranged generally vertically, said front main frame being connected to said front portion of said engine assembly,
first and second upper pipes connected to said front main frame, and
first and second lower pipes connected to said first and second upper pipes, respectively; and
a rear frame member coupled to a rear portion of said engine assembly for supporting a seat, wherein
said engine assembly, said front frame member, and said rear frame member form a body frame, at least a part of a lower portion of said engine assembly being free from attachment with said front and rear frame members, and
said front main frame includes left and right hanger arms extending rearwardly and connected to left and right sides of said engine assembly, respectively, and wherein each of said lower pipes includes a first end connected to said engine assembly, a second end connected to one of said upper pipes and an intermediate portion connected to said front main frame.

15. A frame structure for a vehicle having at least one front wheel and two rear wheels, the frame structure comprising:
an engine assembly extending in front and rear directions;
a front frame member removably attached to a front portion of said engine assembly for supporting a front wheel suspending mechanism and a steering shaft; and
a rear frame member removably attached to an upper rear portion of said engine assembly for supporting a seat, said rear frame member being operatively coupled to said rear wheels;
wherein said engine assembly, said front frame member, and said rear frame member form a main frame of the vehicle,
said engine assembly includes a horizontally opposed engine having a pair of cylinders projecting generally to right and left sides of a crank case thereof, and
the at least one front wheel and the two rear wheels exert forces on the main frame resulting in a moment on the main frame, the engine assembly supporting a substantial part of said moment.

16. The frame structure for a vehicle according to claim 14, wherein said front frame member comprises:
a front main frame arranged generally vertically, said front main frame being connected to said front portion of said engine assembly;
first and second upper pipes connected to said front main frame; and
first and second lower pipes connected to said first and second upper pipes, respectively.

17. The frame structure for a vehicle according to claim 16, wherein said front main frame includes left and right hanger arms extending rearwardly and connected to left and right sides of said engine assembly, respectively.

18. The frame structure for a vehicle according to claim 15, wherein a step bracket is mounted directly to a lower portion of said engine assembly.

19. The frame structure for a vehicle according to claim 15, wherein said rear frame member comprises:
a pair of center frames, each of said center frames connected to said engine assembly at first ends thereof; and
a pair of rear frames connected to second ends of said pair of center frames at first ends thereof, respectively.

20. The frame structure for a vehicle according to claim 19, wherein each of said pair of center frames comprises:
an upper portion extending in front and rear directions;
a lower portion extending generally vertically from said upper portion, said lower portion including a plurality of fitting projections for removably connecting to said engine assembly; and
a reinforcing portion extending diagonally between said upper and lower portions.

21. The frame structure for a vehicle according to claim 15, wherein said engine assembly is free from attachment with a frame member at an upper intermediate portion and at least a part of lower rear and intermediate portions, and wherein said engine assembly is capable of being removed from the vehicle be detaching said front frame member and said rear frame member.

22. The frame structure for a vehicle according to claim 15, further comprising a center frame connected between said front frame member and said rear frame member.

23. The frame structure for a vehicle according to claim 15, wherein the front frame member is coupled to the engine assembly at at least two points on the front portion of said engine assembly, one of said points being located above the cylinders, and the other of said points being located below said cylinders.

24. The frame structure for a vehicle according to claim 23, wherein one of said points is located on an upper surface of said engine assembly above said cylinders, and the other of said points is located on a lower surface of said engine assembly below said cylinders.

25. The frame structure for a vehicle according to claim 23, wherein the front frame member includes:
a front main frame arranged generally vertically, said front main frame being connected to the point located above the cylinders;
first and second upper pipes connected to said front main frame; and
first and second lower pipes connected to said first and second upper pipes, respectively.

26. The frame structure for a vehicle according to claim 15, wherein the engine assembly supports at least substantially all of said moment.

27. The frame structure for a vehicle according to claim 15, wherein the engine assembly includes a transmission, the rear frame member being coupled to said engine assembly proximate to the transmission, and said transmission extending beneath the rear frame member along a substantial part of an axial length of the rear frame member.

28. The frame structure for a vehicle according to claim 15, wherein the engine assembly extends substantially along a longitudinal direction and is longest in its longitudinal direction, and the rear frame member extends substantially along a longitudinal direction and is longest in its longitudinal direction, the respective longitudinal directions being substantially parallel.

29. A frame structure for a vehicle comprising:

an engine assembly extending in front and rear directions;

a front frame member removably attached to a front portion of said engine assembly for supporting a front wheel suspending mechanism and a steering shaft, said front frame member including, a front main frame arranged generally vertically, said front main frame being connected to said front portion of said engine assembly, first and second upper pipes connected to said front main frame, and first and second lower pipes connected to said first and second upper pipes, respectively; and a rear frame member removably attached to an upper rear portion of said engine assembly for supporting a seat, wherein said engine assembly, said front frame member, and said rear frame member form a main frame of the vehicle, and each of said lower pipes includes a first end connected to said engine assembly, a second end connected to one of said upper pipes and an intermediate portion connected to said front main frame.

* * * * *